(12) United States Patent
Fox (10) Patent No.: US 9,121,486 B2
(45) Date of Patent: Sep. 1, 2015

(54) DIFFERENTIAL HAVING STEEL HYDRAULIC TRANSFER BUSHING

(71) Applicant: Eaton Corporation, Cleveland, OH (US)

(72) Inventor: Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/446,460

(22) Filed: Jul. 30, 2014

(65) Prior Publication Data

US 2015/0031490 A1  Jan. 29, 2015

Related U.S. Application Data (62) Division of application No. 14/049,325, filed on Oct. 9, 2013, now Pat. No. 8,827,859.

(60) Provisional application No. 61/712,239, filed on Oct. 10, 2012, provisional application No. 61/863,093, filed on Aug. 7, 2013, provisional application No. 61/863,026, filed on Aug. 7, 2013.

(51) Int. Cl.

| | |
|---|---|
| *F16H 57/04* | (2010.01) |
| *F16H 48/40* | (2012.01) |
| *F16H 48/08* | (2006.01) |
| *F16H 57/08* | (2006.01) |
| *F16H 48/10* | (2012.01) |
| *F16H 48/27* | (2012.01) |
| *F16H 48/32* | (2012.01) |

(52) U.S. Cl.
CPC ............... *F16H 48/40* (2013.01); *F16H 48/08* (2013.01); *F16H 48/10* (2013.01); *F16H 48/27* (2013.01); *F16H 57/082* (2013.01); *F16H 48/32* (2013.01)

(58) Field of Classification Search
CPC ......... F16H 48/40; F16H 48/27; F16H 48/10; F16H 57/082; F16H 48/08; F16H 48/32
USPC ................. 475/160, 220, 230, 336, 236, 344; 74/606 R, 607
See application file for complete search history.

(56) References Cited

U.S. PATENT DOCUMENTS

| | | | | |
|---|---|---|---|---|
| 4,586,395 | A * | 5/1986 | Fukuchi et al. ................. 74/467 |
| 6,244,386 | B1 * | 6/2001 | Takasaki et al. ............. 184/11.2 |
| 6,840,883 | B2 * | 1/2005 | Orr et al. ....................... 475/230 |
| 7,155,997 | B2 * | 1/2007 | Santelli ........................... 74/607 |
| 7,341,536 | B2 * | 3/2008 | Demirdogen et al. ........ 475/230 |
| 7,686,728 | B2 * | 3/2010 | Imbert ........................... 475/160 |

(Continued)

*Primary Examiner* — David J Hlavka
(74) *Attorney, Agent, or Firm* — Remarck Law Group PLC (57) ABSTRACT

A differential gear mechanism constructed in accordance to one example of the present disclosure can include a differential casing defining first and second output shaft openings. The differential casing can have a case housing portion that defines fluid porting therein. The case housing portion including a hub extending therefrom. The hub can have an inner hub portion and an outer hub portion. The outer hub portion can be stepped down from the inner hub portion. The hub can include a stepped annular face at a transition between the inner and the outer hub portions. A hydraulic transfer bushing can be received by the outer hub of the case housing portion. The hydraulic transfer bushing can define fluid porting therein. The hydraulic transfer bushing can be disposed on the outer hub at a location where the fluid communication porting is fluidly connected to the fluid porting of the case housing portion.

17 Claims, 6 Drawing Sheets

(56) References Cited

U.S. PATENT DOCUMENTS

| | | | |
|---|---|---|---|
| 7,819,040 B2 * | 10/2010 | Meier et al. | 74/607 |
| 8,021,260 B2 * | 9/2011 | Homan | 475/235 |
| 8,083,628 B2 * | 12/2011 | Soybel et al. | 475/160 |
| 8,109,174 B2 * | 2/2012 | Hilker et al. | 74/606 A |
| 8,348,800 B2 * | 1/2013 | Tanaka et al. | 475/221 |
| 8,591,375 B2 * | 11/2013 | Maruyama et al. | 475/231 |

* cited by examiner

DIFFERENTIAL HAVING STEEL HYDRAULIC TRANSFER BUSHING

CROSS-REFERENCE TO RELATED APPLICATIONS

This application is a divisional application of U.S. patent application Ser. No. 14/049,325 filed Oct. 9, 2013 which claims the benefit of U.S. Provisional Application No. 61/712,239 which was filed on Oct. 10, 2012, and U.S. Provisional Application Nos. 61/863,093 and 61/863,026, which were filed on Aug. 7, 2013. The disclosures of each of the above applications are incorporated herein by reference in their entirety.

FIELD

The present disclosure relates generally to differential gear assemblies and more particularly to a differential gear case arrangement having a steel hydraulic transfer bushing.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions. In some arrangements, hydraulic fluid is delivered to actuate the piston.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential casing defining first and second output shaft openings that are coaxially aligned along an axis of rotation of the differential casing. The differential casing can have a case housing portion that defines fluid porting therein. The case housing portion can include a hub extending therefrom. The hub can have an inner hub portion and an outer hub portion. The outer hub portion can be stepped down from the inner hub portion. The hub can include a stepped annular face at a transition between the inner and the outer hub portions. A hydraulic transfer bushing can be received by the outer hub of the case housing portion. The hydraulic transfer bushing can define fluid porting therein. The hydraulic transfer bushing can be disposed on the outer hub at a location where the fluid communication porting is fluidly connected to the fluid porting of the case housing portion.

According to additional features, the case housing portion can be formed of cast iron. The hydraulic transfer bushing can be formed of steel. A hydraulic slip seal can be disposed between the case housing portion and the hydraulic transfer bushing. The hydraulic slip seal can be disposed on the stepped annular face of the hub. The hydraulic slip seal can collectively comprise a first and a second o-ring. The first o-ring can be disposed axially outboard of the fluid porting of the case housing portion and the fluid communication porting of the hydraulic transfer bushing. The second o-ring can be disposed axially inboard of the fluid porting of the case housing portion and the fluid communication porting of the hydraulic transfer bushing. A snap ring can be nestingly received by a notch formed on the hub. The snap ring can capture the hydraulic transfer bushing on the hub.

According to other features, the hydraulic transfer bushing can include a generally circumferential bushing body extending between a first and a second annular face. The bushing body can have an outer circumferential surface and an inner circumferential surface. The bushing body can have a pair of diametrically opposed inset portions that are received by corresponding grooves formed on the outer hub portion. The fluid communication porting can be defined through the pair of diametrically opposed inset portions.

According to still other features, the first fluid communication porting can further comprise a first fluid passage having a first fluid channel formed through the outer circumferential surface and a second fluid channel formed through the first annular face. The first and second fluid channels can be fluidly connected. The fluid communication porting can further include a second fluid passage having a third fluid channel formed through the outer circumferential surface and a fourth fluid channel formed through the first annular face. The third and fourth fluid channels can be fluidly connected.

A differential gear mechanism constructed in accordance to additional features of the instant disclosure can include a differential casing defining first and second output shaft openings that are coaxially aligned along an axis of rotation of the differential casing. The differential casing can have a case portion that defines fluid porting therein. The case housing portion can include a hub extending therefrom. The hub can have an inner hub portion that transitions to an outer hub portion at an annular face. The outer hub portion can have a first outer diameter. The inner hub portion can have a second outer diameter. The second outer diameter can be greater than the first outer diameter. A hydraulic transfer bushing can be received around the outer hub of the case housing portion. The hydraulic transfer bushing can define fluid communication porting therein. The hydraulic transfer bushing can be disposed around the outer hub at a location where the fluid communication porting is fluidly connected to the fluid porting of the case housing portion. A hydraulic slip seal can be disposed against the annular face between the outer hub portion and the hydraulic transfer bushing.

According to other features, the hydraulic transfer bushing can include a generally circumferential bushing body extending between a first and a second annular face. The bushing body can have an outer circumferential surface and an inner circumferential surface. The bushing body can have a pair of diametrically opposed inset portions that are received by corresponding grooves formed on the outer hub portion. The fluid communication porting can be defined through the pair of diametrically opposed inset portions. The fluid communication porting can further comprise a first fluid passage and a second fluid passage. The first fluid passage can have a first fluid channel formed through the outer circumferential surface and a second fluid channel formed through the first annular face. The first and second fluid channels can be fluidly connected. The second fluid passage can have a third fluid channel formed through the outer circumferential surface and a fourth fluid channel formed through the first annular face. The third and fourth fluid channels can be fluidly connected. The case portion can be formed of cast iron. The hydraulic transfer bushing can be formed of steel.

A differential gear mechanism constructed in accordance to additional features of the instant application can include a cast iron differential casing defining first and second output shaft openings that are co-axially aligned along an axis of rotation of the differential casing. The differential casing can have a case portion that defines fluid porting therein. The case housing portion can include a hub extending therefrom. The hub can have an inner hub portion that transitions to an outer hub portion at an annular face. The outer hub portion can have a first outer diameter. The inner hub portion can have a second outer diameter. The second outer diameter can be greater than the first outer diameter. The outer hub portion can define at least one groove extending parallel to the axis of rotation of the differential casing. A steel hydraulic transfer bushing can be received around the outer hub portion of the case housing portion. The hydraulic transfer bushing can define fluid communication porting therein. The hydraulic transfer bushing can be disposed around the outer hub portion at a location where the fluid communication porting is fluidly connected to the fluid porting of the case housing portion. The hydraulic transfer bushing can have at least one inset portion that is received by the at least one groove on the outer hub portion. The at least one inset portion and the at least one groove can cooperate to inhibit rotation of the hydraulic transfer bushing relative to the outer hub portion. A hydraulic slip seal can be disposed against the annular face between the outer hub portion and the hydraulic transfer bushing. A snap ring can be nestingly received by a notch formed on the outer hub portion. The snap ring can axially capture the hydraulic transfer bushing on the hub.

According to additional features, the first fluid communication porting can further comprise a first fluid passage having a first fluid channel formed through the outer circumferential surface and a second fluid channel formed through the first annular face. The first and second fluid channels can be fluidly connected. The fluid communication porting can further include a second fluid passage having a third fluid channel formed through the outer circumferential surface and a fourth fluid channel formed through the first annular face. The third and fourth fluid channels can be fluidly connected.

BRIEF DESCRIPTION OF THE DRAWINGS

The present disclosure will become more fully understood from the detailed description and the accompanying drawings, wherein.

DETAILED DESCRIPTION

Figure 1:
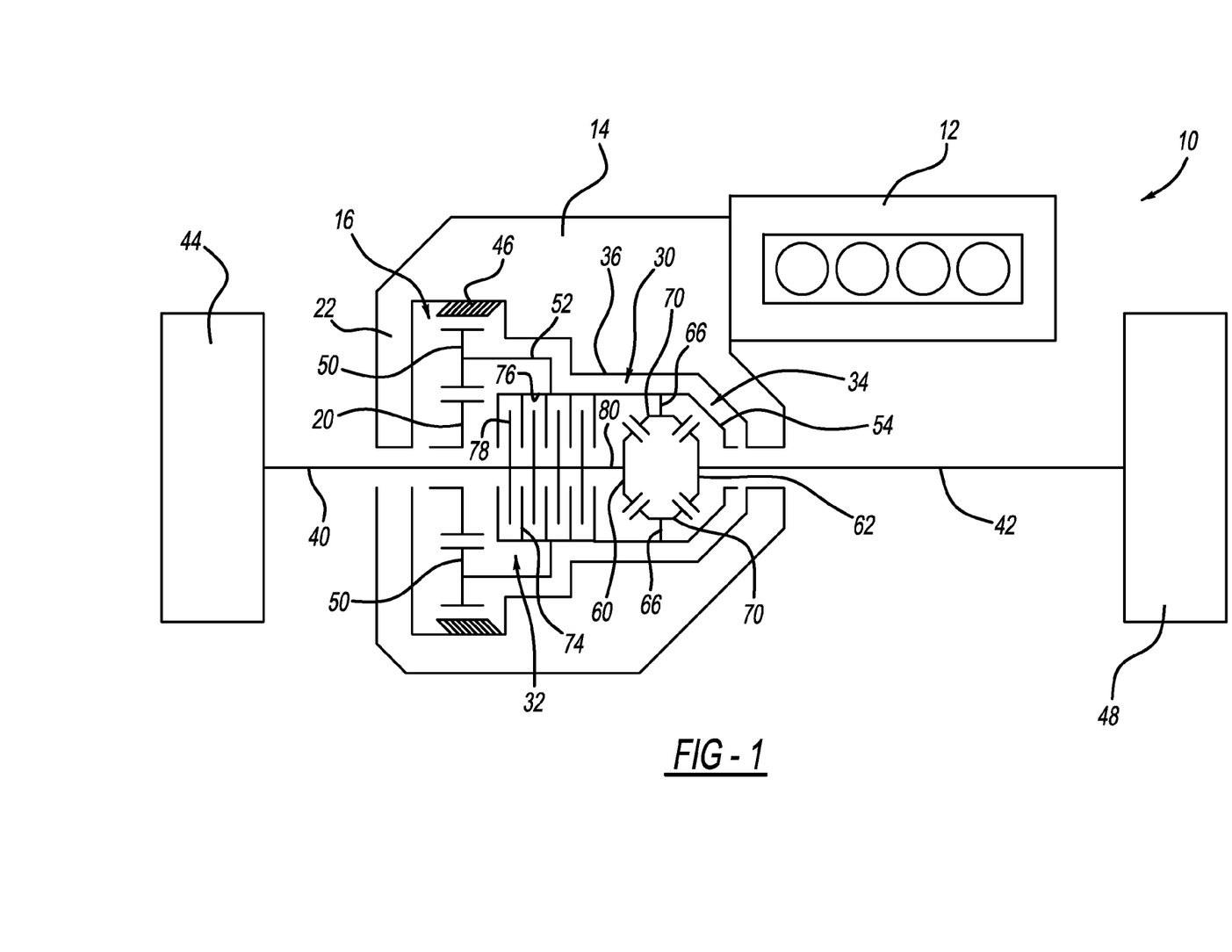
FIG. 1 is a schematic view of an exemplary vehicle driveline incorporating a differential gear mechanism constructed in accordance to one example of the present disclosure.

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a limited slip differential assembly 30 having a planetary gear assembly 16, a clutch assembly 32 and a differential gear assembly or mechanism 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

Figure 3:
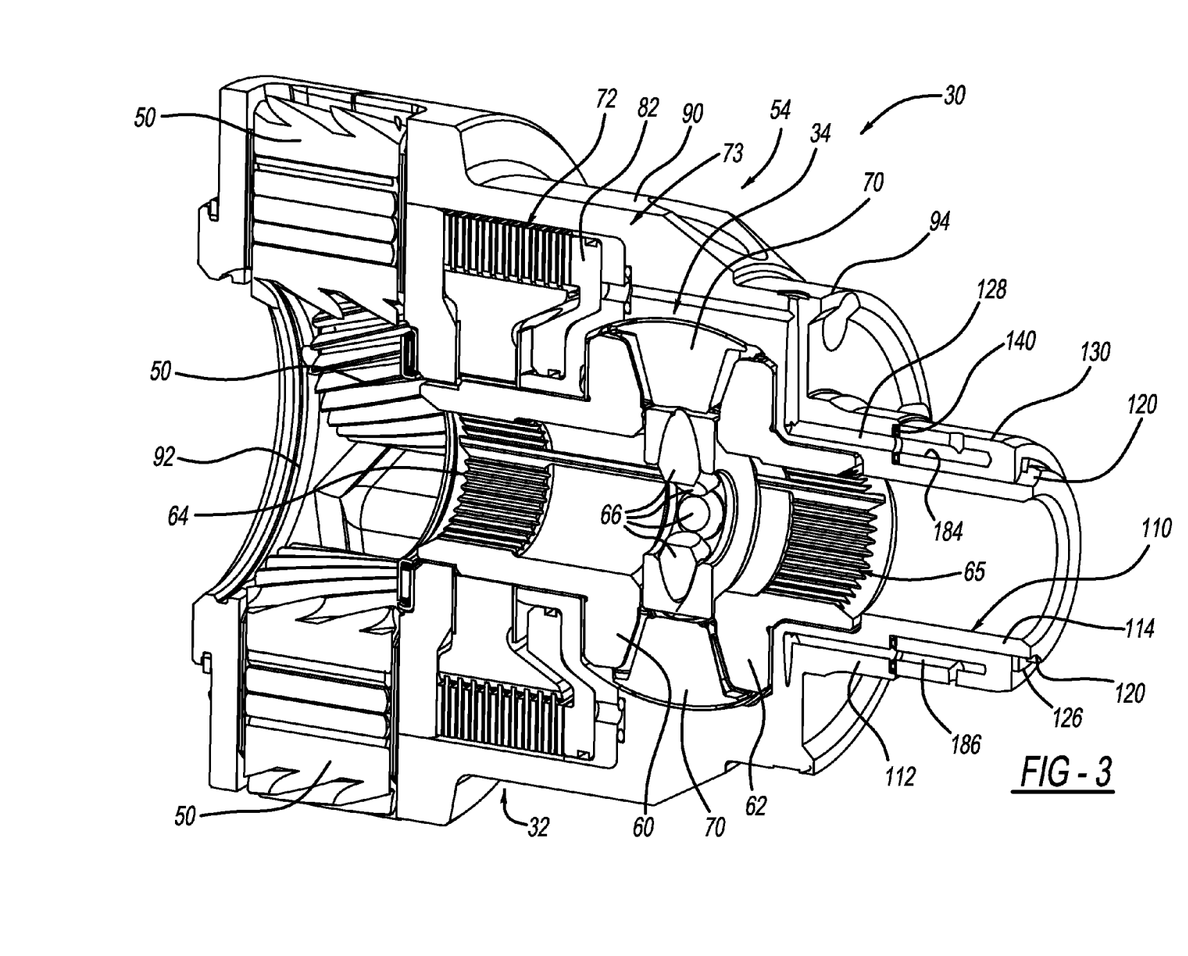
FIG. 3 is a cross-sectional view of the limited slip differential assembly of FIG. 2 taken along lines 3-3.

The differential gear assembly 34 includes a pair of side gears 60 and 62 that are mounted for rotation with the axle shafts 40 and 42 (and first and second drive wheels 44 and 48), respectively. The side gears 60 and 62 define first and second axle shaft openings 64 and 65 (FIG. 3). A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack 72 and a clutch actuator 73. The clutch pack 72 includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid that can act on a piston 82 of the clutch actuator 73 to selectively actuate the clutch pack 72 between the open, closed and partially closed configurations.

Figure 2:
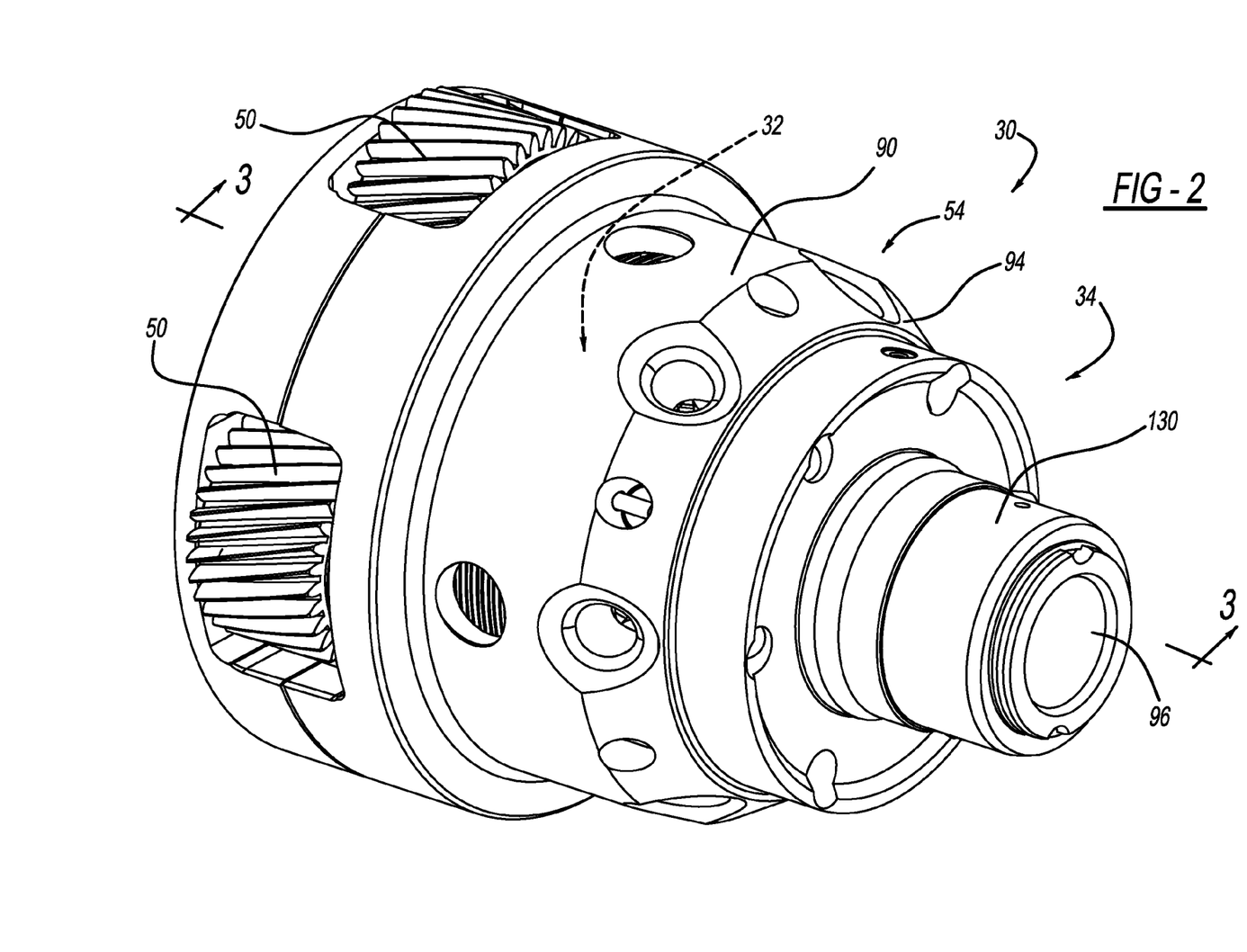
FIG. 2 is perspective view of a limited slip differential assembly incorporating a hydraulic transfer bushing and a differential gear mechanism constructed in accordance to one example of the present disclosure.

With additional reference now to FIGS. 2 and 3, additional features of the differential gear assembly 34 will be described. The differential case 54 can include a first differential case portion 90 that defines a first output shaft opening 92 (FIG. 3) and a second differential case portion 94 that defines a second output shaft opening 96 (FIG. 2). The differential case 54 can be formed of cast iron. In the example shown, the first and second differential case portions 90 and 94 are integrally formed. In other examples, the first and second case portions 90 and 94 can be coupled together such as by a plurality of fasteners.

With particular reference to FIG. 3, the second differential case portion 94 of the differential case 54 can include a hub 110. The hub 110 can include an inner hub portion 112 and an outer hub portion 114. The inner hub portion 112 can have a stepped annular face 116 at a transition to the outer hub portion 114. The outer hub portion 114 can define an outer diameter that is less than the inner hub portion 112. In this regard, the outer hub portion 114 can be stepped down from the inner hub portion 112.

Figure 4:
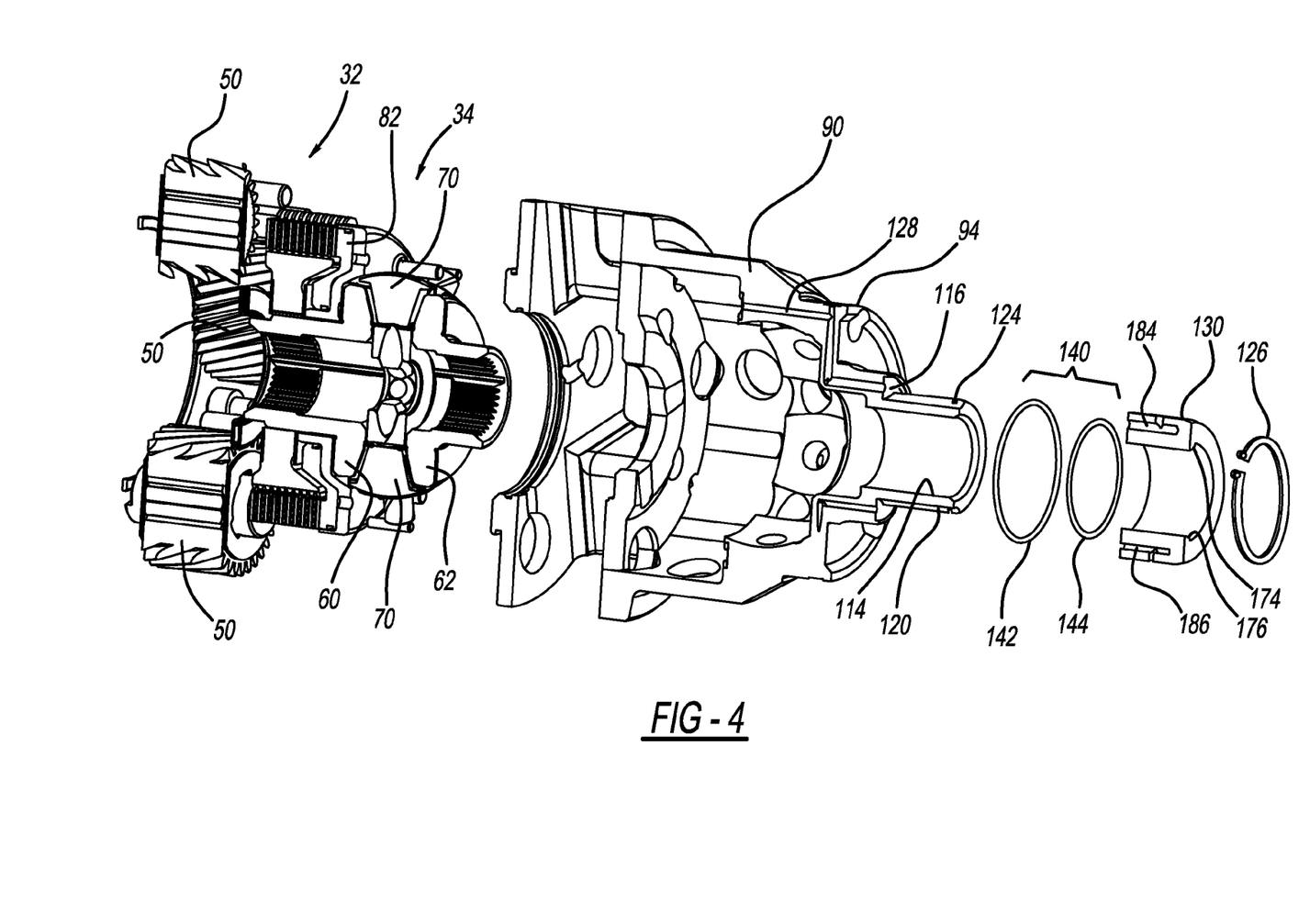
FIG. 4 is an exploded view of the limited slip differential assembly of FIG. 3.
Figure 5:
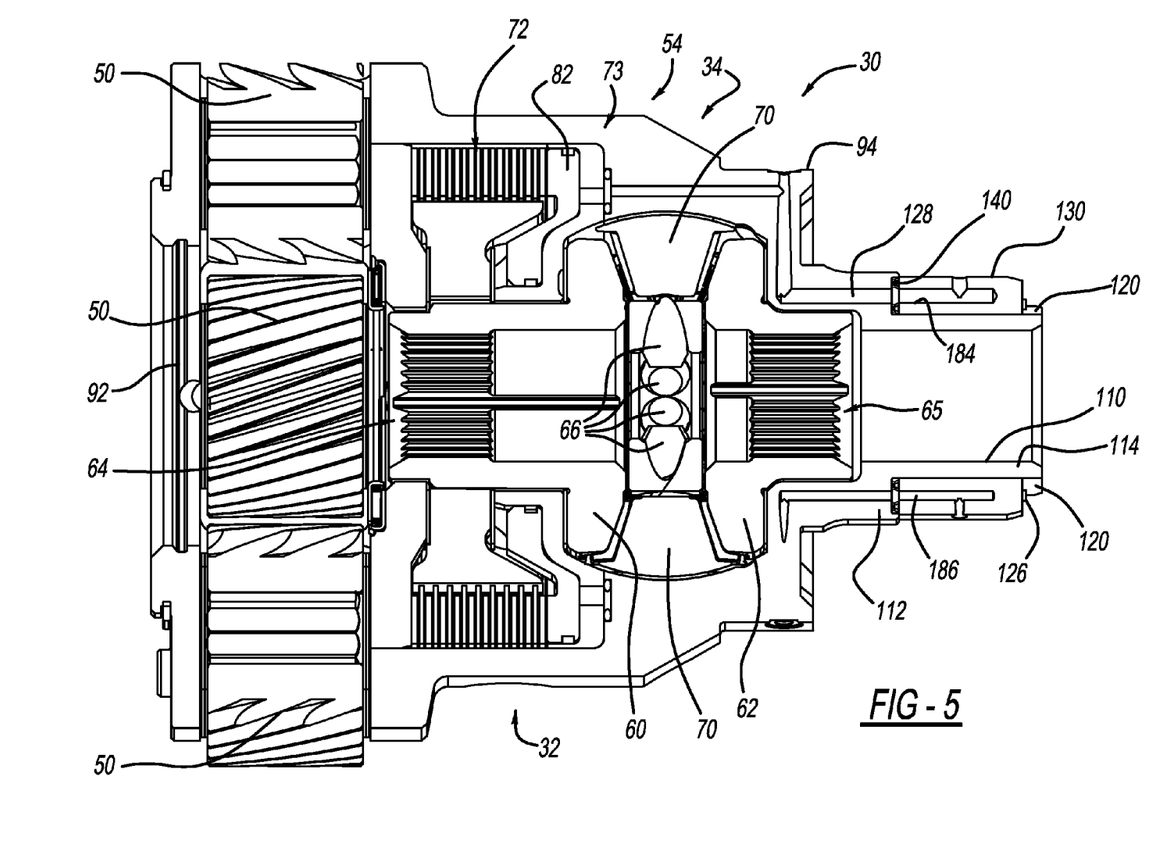
FIG. 5 is a side view of the limited slip differential of FIG. 3.

The outer hub portion 114 can define a pair of grooves 120 therein. The grooves 120 can generally run parallel to an axis of the hub 110. While two grooves 120 are shown in the Figures, it will be appreciated that one or more than two grooves 120 may be incorporated onto an outer diameter of the outer hub 114. A radial notch 124 (FIG. 4) can be defined around the outer diameter of the outer hub 114. The radial notch 124 can be configured to receive an axial retaining member such as a snap ring 126 as will be described herein. The second differential case portion 94 can define fluid porting 128 therein. The fluid porting 128 can route fluid to the clutch assembly 32.

A hydraulic transfer bushing 130 can be received by the hub 110 of the second differential case portion 94. Specifically, the hydraulic transfer bushing 130 can be slidably received by the outer hub 114. A hydraulic slip seal 140 can be positioned between the hydraulic transfer bushing 130 and the face 116 of the inner hub 112. The hydraulic slip seal 140 in the example shown includes a pair of co-axial o-rings including a first o-ring 142 and a second o-ring 144. In the example shown, the first o-ring 142 is disposed axially outboard of the fluid porting 128 and the second o-ring 144 is disposed axially inboard of the fluid porting 128.

It will be appreciated that the hydraulic slip seal 140 may be formed or arranged differently. The hydraulic transfer bushing 130 is formed of steel. In this regard, the hydraulic slip seal 140 performs favorably when ran against steel material. Moreover, a steel hydraulic transfer bushing allows the differential case 54 to be formed of a casting process therefore gaining a material cost savings. Specifically, the arrangement of the present disclosure including the hydraulic slip seal 140 and the steel hydraulic transfer bushing 130 allows for a cast iron differential case 54.

The snap ring 126 can be received by the notch 124 of the outer hub 114 to axially retain the hydraulic transfer bushing 130 on the outer hub 114. The snap ring 126 and more specifically the location of the notch 124 is configured to provide sufficient axial retention onto the hydraulic slip seal 140 so hydraulic fluid does not leak at the junction between the hydraulic transfer bushing 130 and the outer hub 114.

Figures 6, 7, 8:
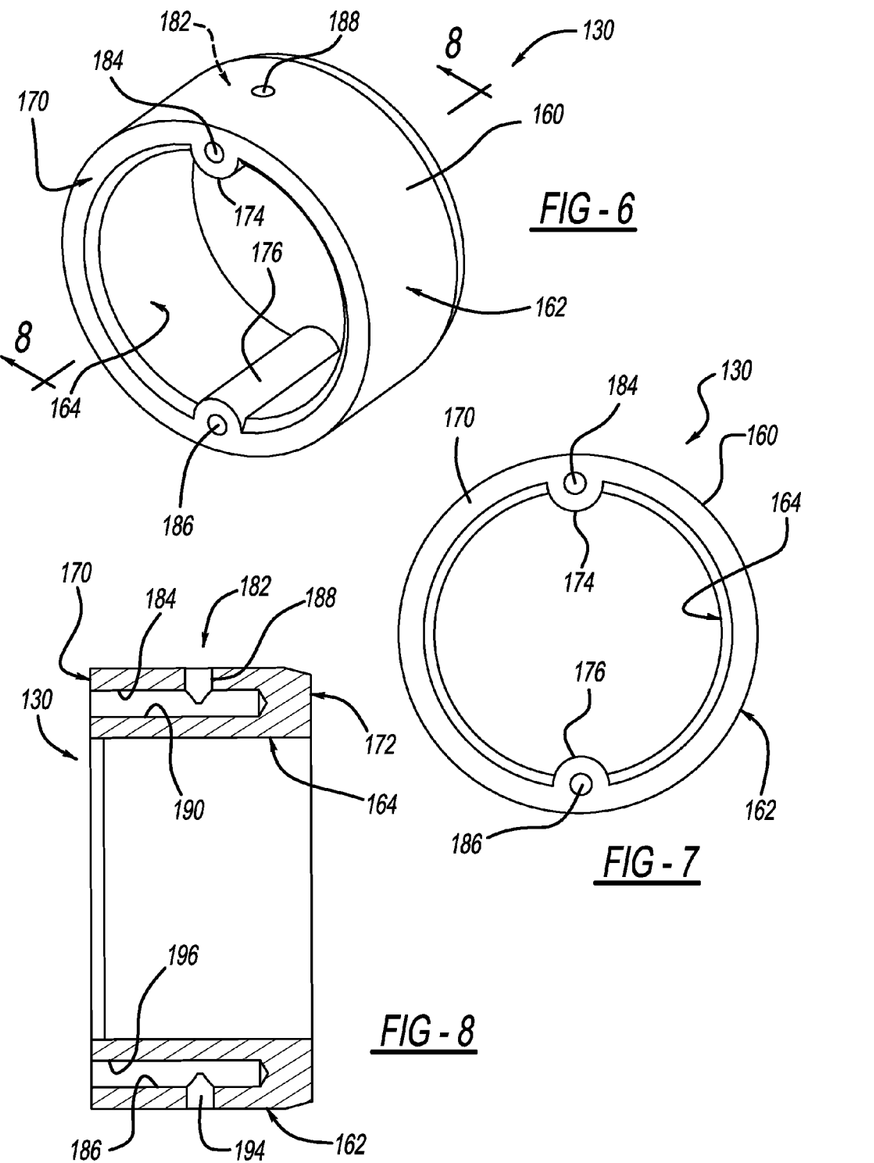
FIG. 6 is a front perspective view of the hydraulic transfer bushing of FIG. 1.
FIG. 7 is an end view of the hydraulic transfer bushing of FIG. 1.
FIG. 8 is a cross-sectional view of the hydraulic transfer bushing of FIG. 6 taken along lines 8-8.

With specific reference now to FIGS. 6-8, the hydraulic transfer bushing 130 will be described in greater detail. The hydraulic transfer bushing 130 can include a generally circumferential bushing body 160 that includes an outer circumferential surface 162 and an inner circumferential surface 164. The bushing body 160 includes a first annular bushing face 170 and a second annular bushing face 172. The bushing body 160 further includes a pair of diametrically opposed inset portions 174 and 176. The inset portions 174 and 176 can be received by the grooves 120 (FIG. 4) on the hub 110. In this regard, the inset portions 174 and 176 can nest in the grooves 120 inhibiting rotation of the hydraulic transfer bushing 130 relative to the hub 110.

Fluid communication porting 182 can be formed in the bushing body 160. The fluid communication porting 182 can be configured to deliver fluid to the fluid porting 128 on the second differential case portion 94 (FIG. 3). Specifically, the fluid communication porting 182 can comprise a first fluid passage 184 and a second fluid passage 186. The first fluid passage 184 can include a first fluid channel 188 and a second fluid channel 190. The first fluid channel 188 can be formed through the outer circumferential surface 162. The second fluid channel 190 can be formed through the first annular face 170. The first and second fluid channels 188 and 190 can be fluidly connected.

The second fluid passage 186 can include a third fluid channel 194 and a fourth fluid channel 196. The third fluid channel 194 can be formed through the outer circumferential surface 162. The fourth fluid channel can be formed through the first annular face 170. The third and fourth fluid channels 194 and 196 can be fluidly connected.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential gear mechanism comprising:
   a differential casing defining first and second output shaft openings that are co-axially aligned along an axis of rotation of the differential casing, the differential casing having a case housing portion that defines fluid porting therein, the case housing portion including a hub extending therefrom, the hub having an inner hub portion and an outer hub portion, the outer hub portion being stepped down from the inner hub portion wherein the hub includes a stepped annular face at a transition between the inner and the outer hub portions;
   a hydraulic transfer bushing received by the outer hub of the case housing portion, the hydraulic transfer bushing defining fluid communication porting therein;
   a hydraulic slip seal disposed between the case housing portion and the hydraulic transfer bushing, the hydraulic slip seal including a first o-ring disposed axially outboard of the fluid porting of the case housing portion and the fluid communication porting of the hydraulic transfer bushing; and
   a snap ring nestingly received by a notch formed on the hub, the snap ring capturing the hydraulic transfer bushing on the hub;
   wherein the hydraulic transfer bushing is disposed on the outer hub at a location where the fluid communication porting is fluidly connected to the fluid porting of the case housing portion.

2. The differential gear mechanism of claim 1 wherein the case housing portion is formed of cast iron.

3. The differential gear mechanism of claim 2 wherein the hydraulic transfer bushing is formed of steel.

4. The differential gear mechanism of claim 1 wherein the hydraulic slip seal is disposed on the stepped annular face of the hub.

5. The differential gear mechanism of claim 1, further comprising a second o-ring disposed axially inboard of the fluid porting of the case housing portion and the fluid communication porting of the hydraulic transfer bushing.

6. The differential gear mechanism of claim 1 wherein the hydraulic transfer bushing includes a circumferential bushing body extending between a first and a second annular face, the circumferential bushing body having an outer circumferential surface and an inner circumferential surface, the bushing body having a pair of diametrically opposed inset portions that are received by corresponding grooves formed on the outer hub portion.

7. The differential gear mechanism of claim 6 wherein the fluid communication porting is defined through the pair of diametrically opposed inset portions.

8. The differential gear mechanism of claim 7 wherein the fluid communication porting further comprises a first fluid passage having a first fluid channel formed through the outer circumferential surface and a second fluid channel formed through the first annular face, wherein the first and second fluid channels are fluidly connected.

9. The differential gear mechanism of claim 8 wherein the fluid communication porting further comprises a second fluid passage having a third fluid channel formed through the outer circumferential surface and a fourth fluid channel formed through the first annular face, wherein the third and fourth fluid channels are fluidly connected.

10. A differential gear mechanism comprising:
    a differential casing defining first and second output shaft openings that are co-axially aligned along an axis of rotation of the differential casing, the differential casing having a case housing portion that defines fluid porting therein, the case housing portion including a hub extending therefrom, the hub having an inner hub portion that transitions to an outer hub portion at an annular face, the outer hub portion having a first outer diameter, the inner hub portion having a second outer diameter, wherein the second outer diameter is greater than the first outer diameter;
    a hydraulic transfer bushing received around the outer hub of the case housing portion, the hydraulic transfer bushing defining fluid communication porting therein wherein the hydraulic transfer bushing is disposed around the outer hub at a location where the fluid communication porting is fluidly connected to the fluid porting of the case housing portion wherein the hydraulic transfer bushing includes a circumferential bushing body extending between a first and a second annular face, the circumferential bushing body having a pair of diametrically opposed inset portions that are received by corresponding grooves formed on the outer hub portion, wherein the fluid communication porting is defined through the pair of diametrically opposed inset portions; and
    a hydraulic slip seal disposed against the annular face between the outer hub portion and the hydraulic transfer bushing.

11. The differential gear mechanism of claim 10 wherein the fluid communication porting further comprises:
    a first fluid passage having a first fluid channel formed through the outer circumferential surface and a second fluid channel formed through the first annular face, wherein the first and second fluid channels are fluidly connected; and
    a second fluid passage having a third fluid channel formed through the outer circumferential surface and a fourth fluid channel formed through the first annular face, wherein the third and fourth fluid channels are fluidly connected.

12. The differential gear mechanism of claim 10 wherein the case portion is formed of cast iron and the hydraulic transfer bushing is formed of steel.

13. A differential gear mechanism comprising:
    a cast iron differential casing defining first and second output shaft openings that are co-axially aligned along an axis of rotation of the differential casing, the differential casing having a case portion that defines fluid porting therein, the case housing portion including a hub extending therefrom, the hub having an inner hub portion that transitions to an outer hub portion at an annular face, the outer hub portion having a first outer diameter, the inner hub portion having a second outer diameter, wherein the second outer diameter is greater than the first outer diameter, the outer hub portion defining at least one groove extending parallel to the axis of rotation;

a steel hydraulic transfer bushing received around the outer hub portion of the case housing portion, the hydraulic transfer bushing defining fluid communication porting therein wherein the hydraulic transfer bushing is disposed around the outer hub portion at a location where the fluid communication porting is fluidly connected to the fluid porting of the case housing portion, the hydraulic transfer bushing having at least one inset portion that is received by the at least one groove on the outer hub portion, the at least one inset portion and the at least one groove cooperating to inhibit rotation of the hydraulic transfer bushing relative to the outer hub portion;

a hydraulic slip seal disposed against the annular face between the outer hub portion and the hydraulic transfer bushing; and a snap ring nestingly received by a notch formed on the outer hub portion, the snap ring axially capturing the hydraulic transfer bushing on the hub.

14. The differential gear mechanism of claim 13 wherein the fluid communication porting further comprises:

a first fluid passage having a first fluid channel formed through the outer circumferential surface and a second fluid channel formed through the first annular face, wherein the first and second fluid channels are fluidly connected; and a second fluid passage having a third fluid channel formed through the outer circumferential surface and a fourth fluid channel formed through the first annular face, wherein the third and fourth fluid channels are fluidly connected.

15. A differential gear mechanism comprising:

a differential casing defining first and second output shaft openings that are co-axially aligned along an axis of rotation of the differential casing, the differential casing having a case housing portion that defines fluid porting therein, the case housing portion including a hub extending therefrom, the hub having an inner hub portion and an outer hub portion, the outer hub portion being stepped down from the inner hub portion wherein the hub includes a stepped annular face at a transition between the inner and the outer hub portions; and a hydraulic transfer bushing received by the outer hub of the case housing portion, the hydraulic transfer bushing defining fluid communication porting therein, the hydraulic transfer bushing further including a circumferential bushing body extending between a first and a second annular face, the circumferential bushing body having an outer circumferential surface and an inner circumferential surface, the bushing body having a pair of diametrically opposed inset portions that are received by corresponding grooves formed on the outer hub portion, wherein the fluid communication porting is defined through the pair of diametrically opposed inset portions;

wherein the hydraulic transfer bushing is disposed on the outer hub at a location where the fluid communication porting is fluidly connected to the fluid porting of the case housing portion.

16. The differential gear mechanism of claim 15 wherein the fluid communication porting further comprises a first fluid passage having a first fluid channel formed through the outer circumferential surface and a second fluid channel formed through the first annular face, wherein the first and second fluid channels are fluidly connected.

17. The differential gear mechanism of claim 16 wherein the fluid communication porting further comprises a second fluid passage having a third fluid channel formed through the outer circumferential surface and a fourth fluid channel formed through the first annular face, wherein the third and fourth fluid channels are fluidly connected.

* * * * *